United States Patent
Heinemann

(10) Patent No.: US 7,401,005 B2
(45) Date of Patent: Jul. 15, 2008

(54) AVERAGING TRACE FUNCTION WITH INDEXING BY A PROCESS SIGNAL

(75) Inventor: Gerhard Heinemann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 916 days.

(21) Appl. No.: 10/338,326

(22) Filed: Jan. 8, 2003

(65) Prior Publication Data

US 2003/0130825 A1 Jul. 10, 2003

(30) Foreign Application Priority Data

Jan. 10, 2002 (DE) ............... 102 00 682

(51) Int. Cl.
*H03F 1/26* (2006.01)
(52) U.S. Cl. .......................... 702/189; 702/80
(58) Field of Classification Search ............ 702/80, 702/79, 124, 125, 127, 177, 151, 150, 189; 318/565, 568.16, 573; 340/648; 700/170, 700/275
See application file for complete search history.

(56) References Cited

U.S. PATENT DOCUMENTS

| | | | |
|---|---|---|---|
| 4,226,122 A | | 10/1980 | Lund et al. |
| 4,908,825 A | * | 3/1990 | Vea ............... 370/526 |
| 6,519,536 B1 | * | 2/2003 | Brunacci et al. ........ 702/50 |
| 2004/0012874 A1 | * | 1/2004 | Chainer et al. ......... 360/51 |

FOREIGN PATENT DOCUMENTS

| | | | |
|---|---|---|---|
| WO | WO 87/07026 | * | 5/1986 |
| WO | WO87/07026 | * | 5/1986 |
| WO | WO 87/07026 | | 11/1987 |
| WO | WO87/07026 | | 11/1987 |

OTHER PUBLICATIONS

Tagungsband Messcomp '92, Messen und Verabeiten elektrischer und nichtelektrischer Groössen, Sep. 07-09, 1992, Wiesbaden, pp. 133-138.

* cited by examiner

*Primary Examiner*—Manuel L. Barbee
(74) *Attorney, Agent, or Firm*—Henry M. Feiereisen

(57) ABSTRACT

A recording of a first selectable process signal of a system is indexed by a second process signal that is different from the timing signal of the system. First process signals acquired in this way are stored in a memory as a function of the index-forming second process signal, wherein a measurement value represented by a first process signal is distributed over adjacent memory locations of the memory if the first acquired process signal has a non-integer index.

13 Claims, 2 Drawing Sheets

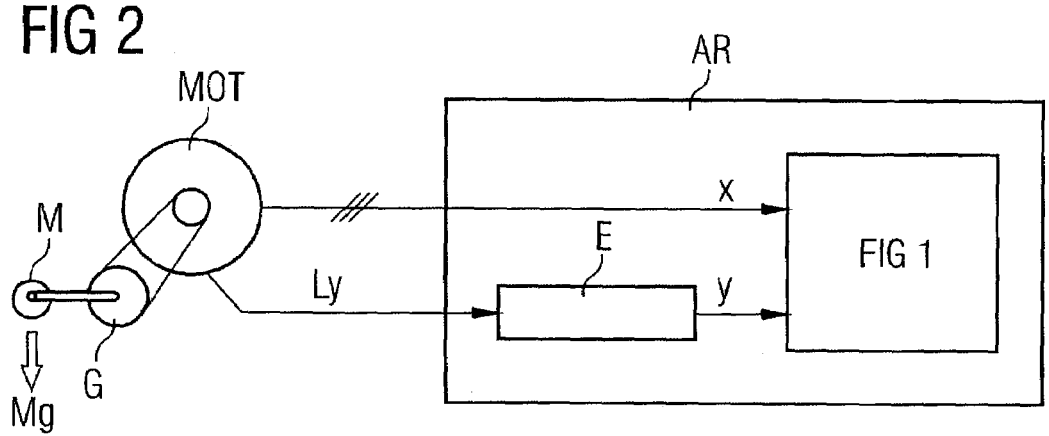
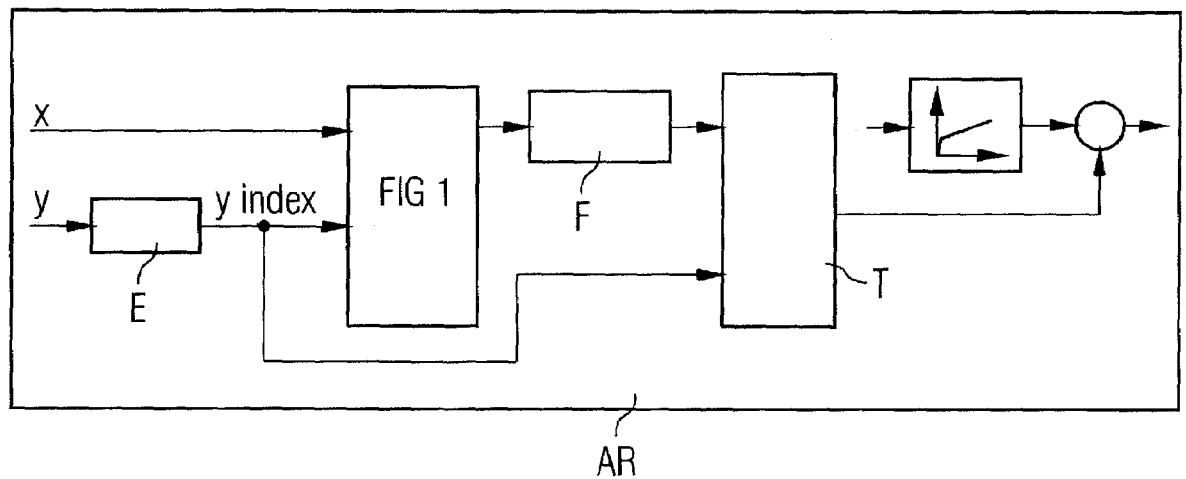

AVERAGING TRACE FUNCTION WITH INDEXING BY A PROCESS SIGNAL

CROSS-REFERENCES TO RELATED APPLICATIONS

This application claims the priority of German Patent Application, Serial No. 102 00 682.2, filed Jan. 10, 2002, pursuant to 35 U.S.C. 119(a)–(d), the disclosure of which is incorporated herein by reference.

BACKGROUND OF THE INVENTION

The present invention relates to a method for recording a selectable process signal of a system, and more particularly to a method for recording process signals as a function of system variables other that the timing signal of the system.

Certain functions, sometimes also referred to as trace functions, are employed in drive controllers and other types of controllers which store selectable process signals indexed by a clock signal, typically having equidistant time intervals. Either temporal functions or, after a transformation, frequency functions are recorded.

Functions to be recorded that do not depend on the time, but from other process variables, still have to be stored with a time index as independent variable. Due to the limited number of memory locations, measurements can only be recorded over a limited time, which may prevent significant mutual dependencies of the process signals to be inferred. It is then also not possible to directly average the process signal to be recorded with respect to the index-forming signal in the trace memory.

For this reason, external auxiliary devices with special functionality are frequently employed to process the measurement values.

It would therefore be desirable and advantageous to provide a trace function which allows indexed measurement values to be stored independent of a time index. It would also be desirable and advantageous to directly average a process signal to be recorded with respect to an index-forming signal.

SUMMARY OF THE INVENTION

According to one aspect of the present invention, in a method for recording a first selectable process signal of a system, the recording is indexed by a second process signal that is different from the timing signal of the system, and first process signals acquired in this way are stored in a memory as the function of the index-forming second process signal. The measurement value acquired with a non-integer index for a first process signal is distributed over adjacent memory locations of the memory.

It has proven to be advantageous to distribute the measurement value of an acquired first process signal having a non-integer index over at least two adjacent memory locations of the memory in a weighted fashion.

According to another feature of the present invention, the at least two adjacent memory cells may be selected based on the integer portion of the non-integer index. The acquired process signal that is to be recorded and has a non-integer index can also be integrated in the at least two adjacent memory cells according to the fractional numbers of the non-integer index.

Advantageously, a weighted average of the distributed measurement values is recorded in parallel.

According to another feature of the present invention, the index for the beginning of the memory range can be formed by a predefined minimum value of the second process signal.

Likewise, the end of the memory range can be formed by a predefined maximum value of the second process signal.

The index-forming second process signal can also be weighted by a gear factor and/or a modulo function. With this arrangement, process signals on the load side of a drive train can be used as process signals to be acquired.

According to another feature of the present invention, the memory can be a trace memory organized as a ring buffer and the content of the trace memory can be transferred to a table that is addressable with the same index as the ring buffer, wherein non-integer indices are used for interpolation between table entries. The content of the table can be used for pre-controlling controlled variables of the system.

According to another aspect of the invention, the recorded first process signals are averaged with respect to the second process signals based on the recorded weights of the measurement values.

A method according to the invention can be used for acquiring deterministic position-dependent disturbance values caused by external process forces in an electric drive. The index-forming second process signal can hereby be formed by a load rotation angle that is weighted by the weighting factor and/or the modulo function, with the motor torque being recorded as the first processing signal. The method of the invention can hence be used to record a rotation-angle-dependent torque curve for use in a drive controller for pre-controlling load forces.

With the method of the invention, measurement values of process signals can be universally and flexibly acquired without requiring a direct temporal dependence, for example for acquiring friction curves tool monitoring monitoring the wear of guides and bearings pre-control compensation of deterministic disturbance values, such as process forces and torque or force ripple of motors.

This may provide, i.a., the following advantages:

an exact, finely resolved association of the values of the recorded process signals with the values of the index-forming process signals;

as a consequence thereof, a possibility for exact averaging with repeating index values;

reduced memory usage, in particular when process signals change only slowly or irregularly with time, since the measurement method does not use time as an independent variable;

a user does not have to parameterize start times or trigger conditions.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 2 is a schematic circuit diagram of an embodiment of the invention for acquiring cyclical, position-dependent disturbance signals caused by external process forces; and FIG. 3 is a schematic circuit diagram for using the data in the trace memory for a table for pre-controlling disturbance values.

DETAILED DESCRIPTION OF PREFERRED EMBODIMENTS

Figure 1:
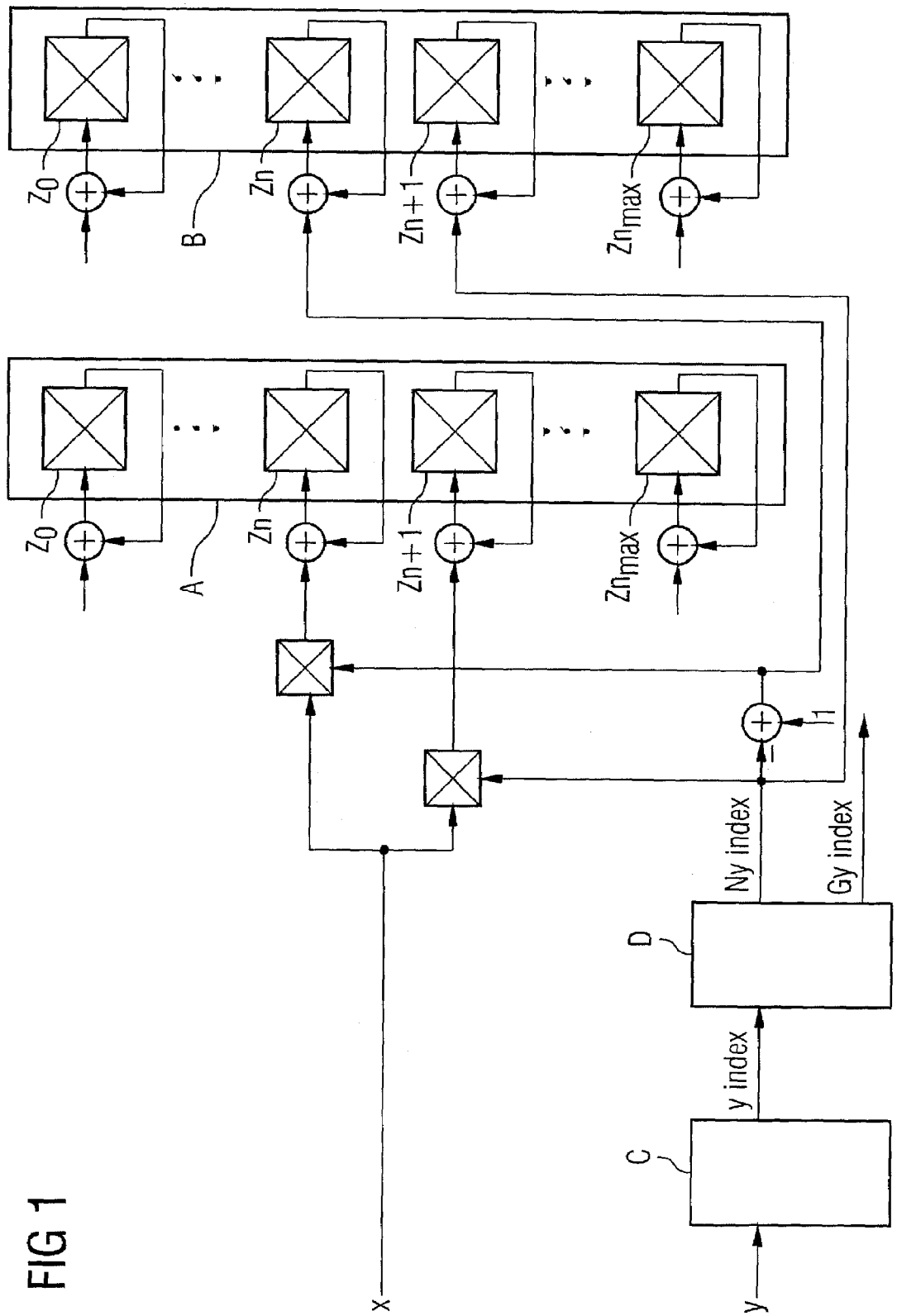
FIG. 1 is a schematic circuit diagram for distributing and averaging measurement values in trace memory with indexing by a process signal according to the invention.

Throughout all the Figures, same or corresponding elements are generally indicated by same reference numerals. These depicted embodiments are to be understood as illustrative of the invention and not as limiting in any way.

The exemplary method described in conjunction with the invention generalizes a trace function by not using the timing signal, but a general process signal, as an index in a ring buffer which serves as trace memory. The recording is not indexed by a timing signal (with equidistant timing intervals), but is indexed by an arbitrary process signal (e.g., rotation angle of the motor, axis position, pole position, rotation speeds). The minimum and maximum values of the process quantity can, for example, form an index for the beginning and the end of the trace memory.

By distributing the measurement values according to the invention, as described hereinafter with reference to FIG. 1, the process signal to be recorded can be distributed over at least two adjacent memory cells if the index is not pointing directly at a memory cell, but between two memory cells. For a non-integer index, the measurement values to be recorded can be distributed over at least two adjacent memory cells of the trace memory.

The process signal is preferably recorded by integration. Problems associated with overflow can be solved, for example, by using a wide floating point memory format or by an online-recursive averaging method.

The recorded process signals can be accurately averaged with respect to the index-forming process signal by recording in addition the weighting of the measurement value distribution, if the index values repeat (deterministically or stochastically). The weighting of the distribution over the memory cells is also recorded. A memory algorithm can be recalled with a fixed time pattern or at arbitrary points in time which can be selected by an additional condition (e.g., when a predetermined signal level is exceeded).

FIG. 1 shows a schematic diagram of a first embodiment of the invention for distributing and averaging the measurement value in the trace memory. The trace memory is preferably organized in form of a ring buffer and includes two trace channels A and B, which each have memory cells $Z_0$ to $Z_{nmax}$, wherein $n_{max}$ indicates the number of memory cells. Two signals are processed, namely the process signal x to be recorded and the index-forming process signal y.

In a first processing unit C, for example a processor, the index is computed from the index-forming process signal y as follows:

$$y_{index} = (y - y_{min})/(y_{max} - y_{min}) + n_{max}$$

In a subsequent additional processing unit D, which can be the same processor, $y_{index}$ is divided into $Gy_{index}$ representing the integer part of $y_{index}$ and $Ny_{index}$ representing the non-integer fraction of $y_{index}$.

The integer part $Gy_{index}$ of the index $y_{index}$ selects the memory cells $Z_n$ and $Z_{n+1}$ for storage. The process signal x to be recorded is integrated in the cells $Z_n$ and $Z_{n+1}$ of the trace channel A according to the non-integer fraction $Ny_{index}$ of $y_{index}$, as indicated by the adder +. x is weighted by multiplication with the non-integer fraction $Ny_{index}$.

The distribution of measurement values is simultaneously recorded in trace channel B so as to subsequently enable an exact averaging. In this way, one obtains an averaging trace function that is indexed by the process signal y.

The index forming process signal y can be further weighted by a gear factor and/or a modulo function. For calculating the index, parameters for adjusting a gear factor and/or a modulo function are provided, so that process signals on the load side of the drive train can generally also be used.

FIG. 2 shows a second embodiment which makes it possible to measure cyclical, position-dependent disturbance signals caused by external process forces.

A motor MOT drives an eccentric load mass M via a gear G, with a gravitational force Mg acting on the mass M. The motor MOT supplies phase currents as well as a position signal Ly from a motor transducer to a drive regulator AR, which can have the layout shown schematically in FIG. 1. Parameters for adjusting a gear factor and/or a modulo function are applied to the signal Ly in an additional processing unit E, thereby forming the index-forming signal $y_{index}$.

The gear factor and/or modulo weighting enable the use of the load rotation angle of the motor MOT as an index-forming process signal $y_{index}$. The process signal x to be recorded is represented by the nominal torque value. The motor torque is hence recorded as a function of the load rotation angle.

The averaging trace function generates a rotation-angle-dependent torque curve which can be used in the drive regulator AR for pre-controlling the gravitational force. It would also be feasible to measure bearing friction, machining forces, force ripple caused by asymmetries in the motor, etc. The measurements can also be used in self-adjusting pre-control (feed-forward circuits) and monitoring devices.

After having formed the average values, a table can be populated with the characteristic curves recorded in the trace memory and used, for example, for pre-controlling control variables. FIG. 3 shows a schematic diagram for processing the table in the drive regulator AR, wherein the data in the trace memory are used with a table T for pre-controlling disturbance variables.

The signals can be processed as indicated in FIG. 2. The content of the trace memory is then transferred to a table T which can be addressed with the same index signal $y_{index}$ as the trace memory. The output of this table function can be used for pre-controlling controlled variables by supplying the variables to a controller.

A conversion function F can be interposed between the trace memory and the table memory T. The conversion function F can be implemented in the drive controller or in an external device (e.g., engineering system).

The contents of the averaging trace memory are preferably supplied to a table having an identical memory depth. This table can be addressed with the same index signal that is used in the trace memory. Non-integer indices $y_{index}$ can be used for interpolation between table entries. The data can be transferred from the trace memory to the table memory cyclic, acyclic, online, or offline.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for recording a first selectable process signal of a system, comprising the steps of:
　acquiring the first selectable process signal;
　indexing the acquired first selectable process signal by a second process signal that is different from a timing signal of the system;
　storing the acquired first process signal in a memory as a function of the index-forming second process signal; and
　distributing a measurement value representing a single acquired value of the first stored process signal over at least two adjacent memory locations of the memory in a weighted fashion if the acquired first process signal has a non-integer index.

2. The method of claim 1, wherein the at least two adjacent memory cells are selected based on the integer portion of the non-integer index.

3. The method of claim 1, wherein the acquired process signal that is to be recorded and has a non-integer index is integrated in the at least two adjacent memory cells according to the fractional numbers of the non-integer index.

4. The method of claim 1, wherein the weighted average of the distributed measurement value is recorded over the at least two adjacent memory locations in parallel.

5. The method of claim 4, wherein the recorded first process signals are averaged with respect to the second process signals based on the recorded weights of the measurement values.

6. The method of claim 1, wherein the index for the beginning of the memory range is formed by a predefined minimum value of the second process signal.

7. The method of claim 1, wherein the index for the end of the memory range is formed by a predefined maximum value of the second process signal.

8. The method of claim 1, wherein the index-forming second process signal is weighted by a gear factor.

9. The method of claim 1, wherein the index-forming second process signal is weighted by a modulo function.

10. Use of the method according to claim 9, wherein the index-forming second process signal is formed by a load rotation angle that is weighted by at least one of a weighting factor and a modulo function, and wherein a motor torque is recorded as the first processing signal.

11. Use of the method according to claim 10, wherein a rotation-angle-dependent torque curve is recorded for use in a drive controller for pre-controlling load forces.

12. The method of claim 1, wherein the memory is a trace memory organized as a ring buffer and content of the trace memory is transferred to a table that is addressable with the same index as the ring buffer, wherein non-integer indices are used for interpolation between table entries.

13. The method of claim 12, wherein the content of the table is used for pre-controlling controlled variables of the system.

* * * * *